Aug. 31, 1965  R. R. DENMAN  3,203,778
PRESSING GLASS PARISONS
Filed April 10, 1961  4 Sheets-Sheet 1
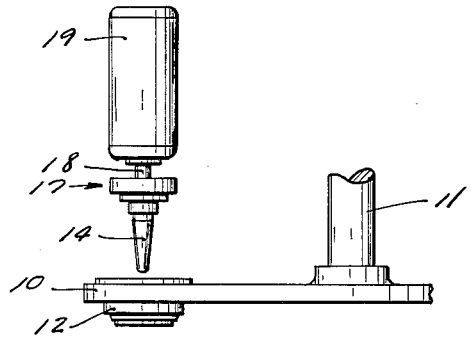
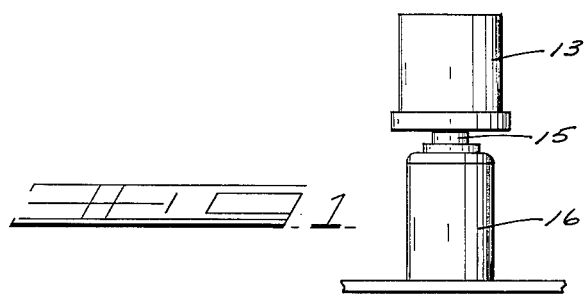
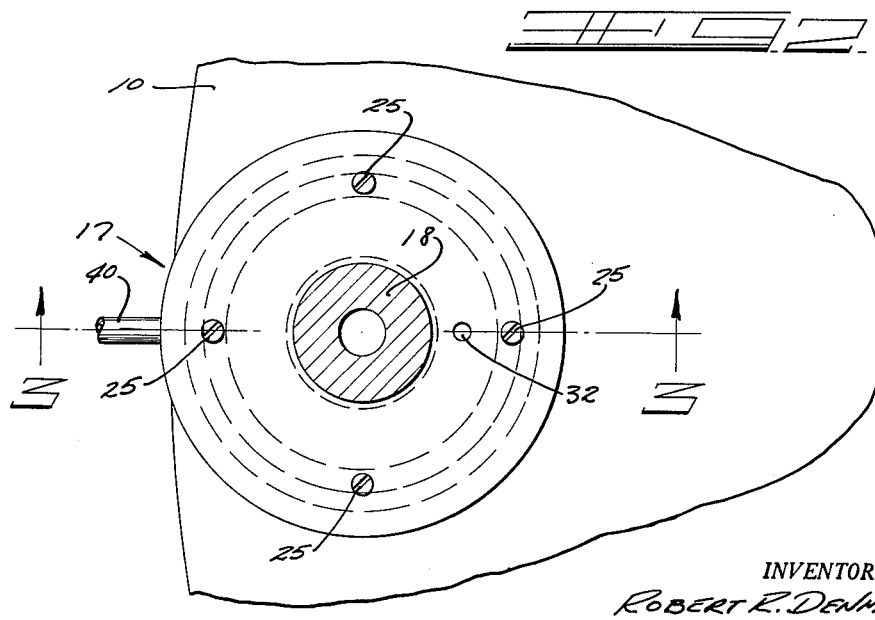
INVENTOR.
ROBERT R. DENMAN
BY *D. T. Innis* &
*W. A. Schaich*
ATTORNEYS

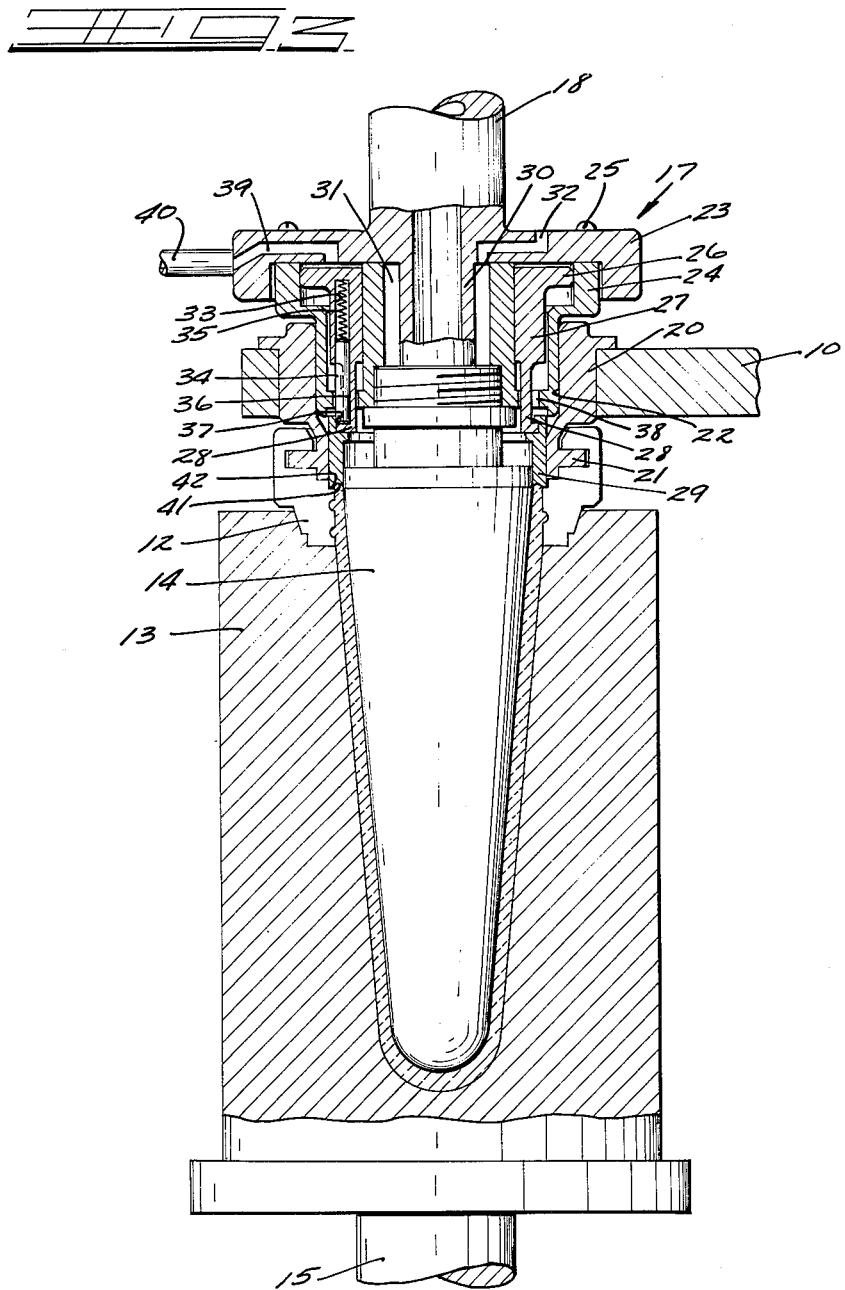

Aug. 31, 1965  R. R. DENMAN  3,203,778
PRESSING GLASS PARISONS
Filed April 10, 1961  4 Sheets-Sheet 3
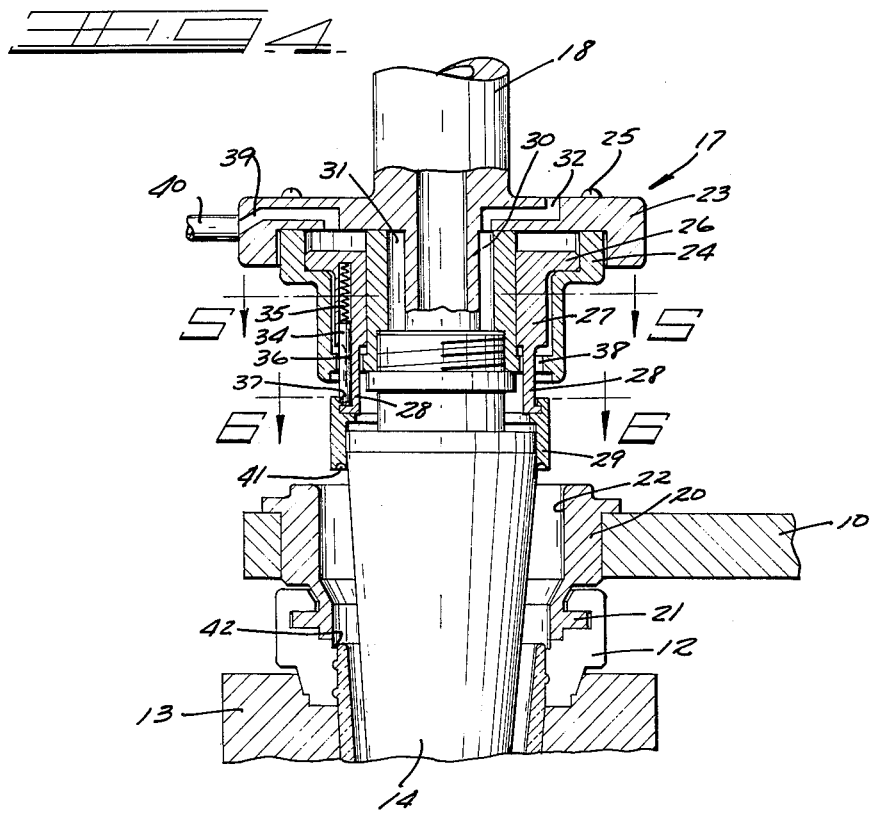
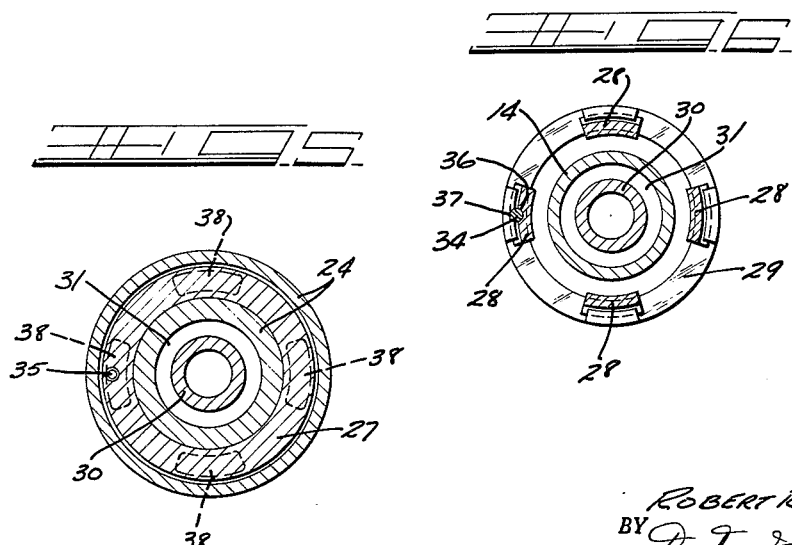
INVENTOR.
ROBERT R. DENMAN
BY
ATTORNEYS Aug. 31, 1965   R. R. DENMAN   3,203,778
PRESSING GLASS PARISONS
Filed April 10, 1961   4 Sheets-Sheet 4
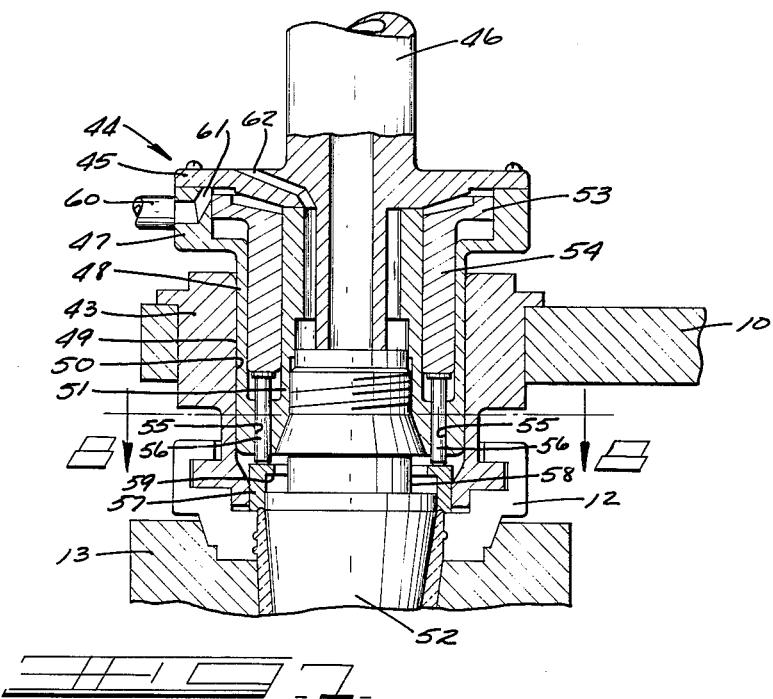
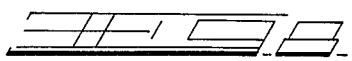
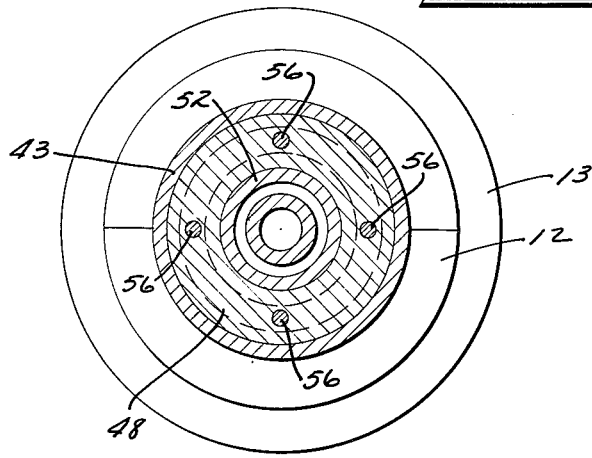
INVENTOR.
ROBERT R. DENMAN
BY
ATTORNEYS

United States Patent Office 3,203,778
Patented Aug. 31, 1965

3,203,778
PRESSING GLASS PARISONS
Robert R. Denman, Toledo, Ohio, assignor to Owens-Illinois Glass Company, a corporation of Ohio
Filed Apr. 10, 1961, Ser. No. 101,749
4 Claims. (Cl. 65—68)

When this invention relates to a method for forming glass parisons. More particularly, this invention relates to a method for forming parisons in which the hold-down force on the thimble is controllable as to amount and timing.

In forming parisons where the mold charge is pressed within a parison mold by insertion of a plunger through a neck forming mold, it is necessary that a thimble be retained against the neck forming mold in axial alignment therewith. This thimble defines the annular top edge of the neck of the container being formed. The thimble may be retained by the neck mold supporting structure in which case the thimble will remain in its final position and when mold charges are loaded through the neck molds, the charges will necessarily have to be of a diameter less than the internal diameter of the thimble.

In order to provide more room for the mold charge to pass through the neck molds, it becomes advantageous to mount the thimble on the plunger support so that it will be removed from the top of the neck mold during loading of mold charges. In this situation, the thimble is carried by the plunger mechanism and is retracted with the plunger. When the plunger is placed in pressing position, it is necessary that the thimble seat on the neck mold and be held in this position during the final pressing movement of the plunger. At this time the glass is forced into the neck mold and against the thimble.

It has been the practice to hold the thimble against the neck mold by the use of a compression spring acting between the thimble and the plunger support.

In plunger mechanism in which a spring is used to hold the thimble against the neck mold, changes in the weight and volume of the gobs being fed to the parison mold will cause slightly different plunger penetration into the glass. The spring, which is acting between the thimble and the plunger support will exert a varying force on the plunger support and thimble depending upon the compression of the spring due to the varying plunger penetration. Since the plunger support is hydraulically driven, the pressing force is constant except for the force required to be used to compress the thimble hold-down spring.

Because of these variations in hold-down force, due to the necessity of compressing the hold-down spring, there will be a resulting change in effective pressing force by the plunger. Obviously, it is desirable that the pressing force be identical during the pressing of successive parisons. The effective pressing force will be changed by a change in penetration of the plunger into the parison mold when pressing mold charges of different weights and will be more pronounced when the plungers are of the long slender type used in pressing narrow neck parisons. Thus the use of springs for holding down the thimble has distinct disadvantages.

In view of the disadvantages of the present apparatus for forming parisons, it is an object of this invention to provide a method of pressing parisons in which the force required to hold down the thimble is constant during pressing.

It is a further object of this invention to provide a method of forming parisons in which the hold-down force on the thimble may be reduced during the pressing of parisons and then increased during the retraction of the plunger.

Other objects and advantages will become apparent from the following detailed description of the two embodiments of the invention taken in connection with the drawings wherein:

FIG. 1 is a schematic elevational view of the parison forming mechanism in retracted position.

FIG. 2 is a plan view of the plunger adapter of the invention.

FIG. 3 is a cross-sectional view taken at line 3—3 of FIG. 2 showing the plunger and support in pressing position.

FIG. 4 is a view similar to FIG. 3 showing the plunger and support partially retracted from the neck mold and parison molds.

FIG. 5 is a cross-sectional view taken along the line 5—5 of FIG. 4.

FIG. 6 is a cross-sectional view taken along line 6—6 of FIG. 4.

FIG. 7 is an elevational view partly in cross-section of the second embodiment of the invention.

FIG. 8 is a cross-sectional view taken at line 8—8 on FIG. 7.

Referring to FIG. 1, there is shown a schematic view of the apparatus to which the present invention is applied. Generally speaking, the apparatus is in the form of a horizontally rotatable turret 10 mounted for rotation about the axis of the turret drive shaft 11.

The turret 10 is adapted to support neck molds 12 and upon rotation of the turret 10 will present the neck molds 12, of which there are a plurality carried by the turret 10, successively into position between and in alignment with a parison mold 13 and a pressing plunger 14. The parison mold 13 is mounted on a vertical shaft 15 and is adapted to be raised and lowered by the operation of a hydraulic motor 16. The plunger 14 depends from a support 17 which has a vertical shaft 18 connected thereto. The shaft 18 is reciprocated by means of a hydraulic motor 19.

Thus it can be seen that with the parison mold raised into contact with the bottom of the neck mold 12 through the actuation of the hydraulic motor 16, a complete parison forming cavity will be provided. With the parison mold and neck mold in contact with each other, a charge of molten glass is delivered to the interior of the mold 13 and the hydraulic motor 19 is actuated to lower the pressing plunger 14 and press the mold charge into the form of a parison within the parison mold and neck mold. The plunger is held down with a predetermined force and for a predetermined time and then retracted. As the plunger is retracted, the parison mold 13 will be lowered thus leaving an exposed parison pendent from the neck mold 12. When the plunger 14 has retracted a sufficient amount to clear the top of the turret and the parison mold has been lowered an amount sufficient to clear the lower end of the parison, the turret 10 will be indexed thus carrying the parison to a position where it may be blown to final form.

Referring now to FIGS. 2 to 6, the details of one embodiment of the invention will be described. The turret 10 has an opening therethrough within which an annular alignment bushing 20 is seated. The bushing 20 has a depending portion 21 which is adapted to support the neck molds 12 in fixed horizontal relationship with respect to the turret 10. The bushing 20 also is provided with an internal piloting surface 22 within which the plunger support 17 is guided. The plunger support 17 comprises a circular flange member 23 formed on the end of shaft 18 and joined to an annular cylinder 24 by a plurality of screws 25. The outer surface of the cylinder 24 is adapted to cooperate with the piloting surface 22 formed in the alignment bushing 20. The cylinder 24 serves to support an annular piston 26 for sliding movement axially therein. The piston 26 has an integrally formed depending sleeve portion 27. The bottom edge of the sleeve 27 carries four depending lugs 28 which extend through elongated openings 38 formed in the bottom of the cylinder.

The openings 38 are of sufficient length so as to permit the lugs 28 to extend therethrough without binding. The lugs have horizontally extending portions that serve as interengaging means with spaced inwardly extending lugs formed on the upper edge of a thimble 29. The plunger 14 is threadedly received within a threaded recess formed in the cylinder member 24 and thus will move the cylinder 24, the flange member 23 and the vertical shaft 18. The shaft 18 and flange member 23 are formed with a depending, coaxial, tubular portion 30 through which coolant is supplied to the interior of the plunger 14 with the coolant being continuously circulated therethrough. The coolant escapes through the area 31 surrounding the tubular portion 30.

The area 31 is connected to atmosphere through a passage 32 formed in the flange member 23. In order to prevent relative rotation of the thimble 29 with respect to the piston 26 and its sleeve portion 27, a vertically extending recess 33 is formed within the sleeve portion 27 of the piston 26. Within this recess is located a locking pin 34 which is biased in a downward direction by means of a spring 35. The locking pin 34 extends vertically downward through one of the openings 38 formed in the bottom of the cylinder 24 and has its lower end in engagement with a slot 36 formed on one of the lugs 28 and a slot 37 formed in one of the lugs on the thimble 29. The slots 36 and 37 are semi-circular and being complementally located will embrace the total circumference of the pin 34 when it is in locking position.

The thimble 29 is maintained in engagement with the neck mold 12 during pressing through the introduction of fluid under pressure to the top of the cylinder 24 through the passageway 39 formed in the flange member 23. Fluid is fed to the passage 39 through a conduit 40 connected thereto.

As can be seen in FIGS. 3 and 4, the thimble 29 has an annular recess 41 formed in the bottom edge thereof which, when the thimble is held against the top of the neck mold 12, will allow the glass being pressed to form a rounded top surface.

The operation of the embodiment shown in FIGS. 2 to 6 is substantially as follows. With the turret 10 positioned with the neck mold 12 and alignment bushing 20 in the position shown, the blank molds are raised into contact with the neck mold 12 and a mold charge is introduced therein. The plunger support 17 is then lowered thereby inserting the plunger into the blank mold cavity. Fluid under pressure is introduced through the conduit 40 and passage 39 to the interior of the cylinder member 24 thus forcing the piston 26 downward to the position shown in FIG. 4. Continued lowering of the plunger 14 and its support 17 will cause the thimble 29 to seat on a horizontal surface 42 of the neck ring 12. As the plunger continues to move and press the glass into the form of a parison, the piston will move upwardly within the cylinder member 24 but the same force will be holding the thimble 29 against the neck ring, regardless of the movement of the plunger 14. The pressure of the fluid introduced into the cylinder member 24 is relatively low at this time being only sufficient to maintain the thimble seated on the neck mold and thus will not cause deflection of the mold parts or result in excessive wear of the thimble and neck molds.

In order to minimize any possibility of loading the mold parts and causing deflection thereof the actual stripping force should take place between the two members involved, namely, the plunger and thimble. Thus upon completion of the time for the plunger 14, the fluid pressure is increased for a short period resulting in the plunger 14 being withdrawn or stripped from the formed parison. The introduction of this relatively high pressure air insures that the thimble 29 will remain in contact with the neck mold 12 and also provides the force used to accomplish the initial retracting movement of the plunger 14. Thus the formed parison is effectively prevented from moving with the plunger relative to the blank mold 13. Shortly after the retraction of the plunger is initiated, the blank mold 13 is lowered thus leaving a formed parison retained within the neck mold 12. The ratio of the two pressures is normally in excess of 10:1. The cycling of high and low pressure to the cylinder 24 is timed from the operating cycle of the machine.

Referring now specifically to FIGS. 7 and 8, there is shown a second embodiment of the invention. This embodiment is similar to the previously described embodiment from the standpoint that a thimble is held against the neck mold by air pressure being applied to a piston. The turret 10 carries neck molds 12 and an alignment bushing 43 in the same manner as described above with respect to FIGS. 3 and 4. A plunger adapter or support 44 has a flanged member 45 to which is integrally formed a vertical shaft 46. A cylinder member 47 is joined to the underside of the flanged member 45 and is provided with an annular depending portion 48 whose outer surface 49 is adapted to pilot within an annular piloting surface 50 formed in the alignment bushing 43, when the plunger is moved into pressing position. The depending portion 48 has an internally threaded lower opening 51 within which the threaded upper end of a plunger 52 is adapted to be received. Thus it can be seen that the plunger 52 and cylinder member 47, joined together, operate as a unit. The cylinder member 47 has a relatively large annular space therein within which an annular piston 53 is slidably mounted for relative vertical motion. The piston 53 has a depending sleeve 54 which is guided within the annular space formed in the depending portion 48 of member 47. A series of vertical holes 55 are formed in the bottom of portion 48 of the member 47. The holes 55 closely retain a plurality of pins 56 which extend therethrough with their upper ends in contact with the bottom end of the sleeve 54. The pins 56, at their lower ends, are adapted to bear against the upper surface or edge of a thimble 57 which is loosely retained in coaxial alignment with the plunger 52. The plunger 52 has an annular groove 58 formed therein within which an inwardly extending flanged portion 59 of the thimble 57 will ride. When the plunger is withdrawn from the neck mold, the flanged portion 59 will engage the bottom of groove 58 and thus be carried by the plunger out of contact with the neck mold.

By introducing fluid under pressure through a conduit 60 and passage 61 to the top of the cylinder member 47, the piston 53 will be biased downwardly and force the pins 56 against the thimble 57. When in retracted position the thimble 57 will have its flanged portion 59 in contact with the bottom surface of the annular groove 58 formed in the plunger 52. However, when in pressing position, as shown in FIG. 7, the thimble 57 will be seated on the neck mold 12 and remain seated thereon during the downward movement of the plunger 52. The pressure of the fluid supplied above the piston 53 will determine the force on the thimble 57 for maintaining it in contact with the neck ring 12.

During the pressing operation of the plunger 52, cooling fluid will be introduced through the shaft 46 downwardly along the axis thereof into the interior of the plunger 52. This cooling fluid is continuously supplied to the interior of the plunger 52 and, after contacting the interior of the plunger, will pass through the outlet port 62 formed in the flanged member 45. The outlet port 62 is connected to a sump or to a return line connected to the coolant supply.

The fluid biased thimble of the invention has an additional advantage in that the forces exerted on the glass during the pressing of the parison may be easily controlled during the pressing period. A low pressure is constantly applied to the thimble during the initial pressing of the parison. The plunger is moved downward by the force exerted by its hydraulic driving motor until this force is balanced by the compression of the molten glass which fills the molds. After the plunger stops moving, it is necessary to maintain the plunger within the molten glass for a dwell period to allow sufficient heat to be extracted from the glass so that it can be transferred and later blown. The optimum condition prevailing during the dwell period is to maintain the plunger within the molten glass without applying any compressive force to glass. This is particularly advantageous because as the glass is chilled or cooled by contact with the parison mold and plunger, the glass will shrink and if the force is maintained on the plunger, it will continue its penetration and result in excessive checking of the parison.

By increasing the fluid pressure within the cylinders 24 or 47, it is possible to reduce the pressing force exerted on the plunger to approximately zero. After the dwell period, a further increase in this fluid pressure will result in retracting the plunger out of the neck mold.

Thus it can be seen that applicant has provided a new method for pressing parisons wherein the pressing force applied to the molten glass will be constant, regardless of small deviations in volume and weight of the charge being pressed. By eliminating the use of a spring for retaining the thimble against the neck mold and substituting therefore a fluid biased piston, the force required to offset the thimble hold-down is constant regardless of variations in the exent of penetration of the plunger within the parison molding apparatus.

Furthermore, applicant has provided a method of pressing parisons wherein the hold-down force on the thimble is increased at the time the plunger is withdrawn, thus insuring that the parison will remain in the blank or parison mold and prevent distortion of the neck of the formed parison. The increased force on the thimble results in a force operating to lift the plunger. Thus the initial plunger retraction is accomplished entirely by the introduction of increased fluid pressure on the thimble.

Various modifications may be resorted to within the spirit and scope of the appended claims.

I claim:
1. The method of forming pressed parisons comprising positioning a parison mold in contact with a relatively stationary neck mold, charging said parison mold, moving a plunger with a predetermined force through said neck mold and into pressing position within the parison mold, simultaneously holding a thimble against the neck mold with a predetermined force acting between the thimble and the plunger, increasing the force on said thimble during the dwell period an amount sufficient to balance the pressing force, then further increasing the force on said thimble in opposing relationship to the force on said plunger to initiate the retraction of said plunger out of the parison mold, and reversing the force on the plunger to complete the retraction of the plunger whereby a parison is formed and held in the neck mold.

2. The method of press forming glass articles comprising bringing a body mold and neck mold into cooperative relationship to form a complete article press mold, charging said mold, moving a plunger into pressing position with in the mold to completely form the glass article, releasing the pressing force on said plunger, simultaneously therewith applying a force to the plunger sufficient to offset the weight of the plunger, maintaining this plunger weight supporting force during the dwell period, applying an additional force to said plunger in the plunger retracting direction to initiate the retraction of said plunger and reversing the movement of said plunger to thereby retract the plunger after the dwell period.

3. The method of pressing parisons comprising positioning a parison mold in contact with a relatively stationary neck mold, charging said parison mold, moving a plunger and thimble into glass pressing relationship with respect to said mold, wherein the plunger extends through the neck mold into the parison mold and the thimble seats on the neck mold, holding the thimble against the neck mold with a predetermined constant force acting between the thimble and plunger, increasing the force on said thimble in opposition to the force on said plunger an amount sufficient to balance the plunger pressing force during the dwell period, then further increasing the force on said thimble to initiate the retraction of said plunger out of the parison mold, and retracting the plunger out of the molds after the dwell period.

4. The method of pressing a charge of molten glass within a mold cavity comprising the steps of moving a plunger with a predetermined fluid pressure into the mold cavity to press the charge into predetermined shape, applying a counter-pressure to said plunger to effectively balance the forces acting on said plunger during a dwell period whereby no pressing force is applied to the glass during the dwell period, increasing the application of said counter-pressure to thereby initiate the retraction of the plunger at the end of the dwell period and reversing the application of pressure to the plunger to thereby complete the retraction of the plunger at the end of the dwell period.

References Cited by the Examiner

UNITED STATES PATENTS

| | | | |
|---|---|---|---|
| 1,578,448 | 3/26 | Lebby | 65—68 |
| 1,909,778 | 5/33 | Marsden | 65—68 |
| 2,011,980 | 8/35 | Miller | 65—314 |
| 2,783,591 | 3/57 | Johnson | 65—251 |
| 2,839,870 | 6/58 | Denman | 65—307 |
| 2,881,564 | 4/59 | Olson | 65—246 |

FOREIGN PATENTS 1,243,991  9/60  France.

DONALL H. SYLVESTER, *Primary Examiner.*